(12) United States Patent
Gallier et al.

(10) Patent No.: US 12,497,896 B2
(45) Date of Patent: Dec. 16, 2025

(54) AIRFOIL ASSEMBLY WITH PLATFORM FILM HOLES

(71) Applicant: GENERAL ELECTRIC COMPANY, Schenectady, NY (US)

(72) Inventors: Kirk Douglas Gallier, Cincinnati, OH (US); Zachary Daniel Webster, Cincinnati, OH (US); Brian Kenneth Corsetti, Reading, MA (US)

(73) Assignee: General Electric Company, Evendale, OH (US)

( * ) Notice: Subject to any disclaimer, the term of this patent is extended or adjusted under 35 U.S.C. 154(b) by 54 days.

(21) Appl. No.: 18/326,684

(22) Filed: May 31, 2023

(65) Prior Publication Data

US 2024/0401483 A1 Dec. 5, 2024

(51) Int. Cl.
*F01D 5/18* (2006.01)

(52) U.S. Cl.
CPC .......... *F01D 5/186* (2013.01); *F05D 2230/10* (2013.01); *F05D 2230/21* (2013.01)

(58) Field of Classification Search
None
See application file for complete search history.

(56) References Cited

U.S. PATENT DOCUMENTS

| | | | |
|---|---|---|---|
| 4,293,275 A * | 10/1981 | Kobayashi | F02C 7/185 416/97 R |
| 5,340,278 A | 8/1994 | Magowan | |
| 5,382,135 A | 1/1995 | Green | |
| 6,196,799 B1 * | 3/2001 | Fukue | F01D 5/187 416/97 R |
| 6,887,033 B1 * | 5/2005 | Phillips | F01D 5/147 415/115 |
| 7,004,720 B2 | 2/2006 | Synnott et al. | |
| 7,416,391 B2 | 8/2008 | Veltre et al. | |
| 7,597,536 B1 | 10/2009 | Liang | |
| 7,905,706 B1 * | 3/2011 | Liang | F01D 5/187 415/115 |
| 8,251,665 B2 * | 8/2012 | Baldauf | F01D 5/22 416/193 A |
| 8,870,535 B2 * | 10/2014 | Lacy | F01D 5/186 416/97 R |
| 8,961,137 B2 | 2/2015 | Berche et al. | |
| 9,091,180 B2 * | 7/2015 | Wiebe | F01D 9/06 |
| 9,810,070 B2 * | 11/2017 | Johns | F01D 5/084 |

(Continued)

FOREIGN PATENT DOCUMENTS

EP 2615245 B1 7/2013

*Primary Examiner* — Kayla Mccaffrey
(74) *Attorney, Agent, or Firm* — Hanley, Flight & Zimmerman, LLC

(57) ABSTRACT

An airfoil assembly for a turbine engine which generates a hot fluid flow and provides a cooling fluid flow. The airfoil assembly includes a platform with radially spaced upper and lower walls, the platform extending between a platform leading edge and a platform trailing edge to define an axial direction and extending between a pair of slash faces, an airfoil having an airfoil wall extending radially between a root and a tip to define a span length, the platform wall extending from the airfoil wall proximate the root. A fillet extends between the heated surface and the airfoil wall and defines at least a portion of the root. The airfoil assembly further includes a set of film holes.

12 Claims, 13 Drawing Sheets

(56) References Cited

U.S. PATENT DOCUMENTS

| | | | |
|---|---|---|---|
| 10,215,030 B2 | 2/2019 | Xu | |
| 10,280,762 B2* | 5/2019 | Mongillo | F01D 5/186 |
| 10,662,780 B2* | 5/2020 | LoRicco | F01D 9/041 |
| 11,047,241 B2* | 6/2021 | Gayman | F01D 5/187 |
| 11,225,873 B2* | 1/2022 | Koenig | F01D 5/187 |
| 2006/0140768 A1* | 6/2006 | Tam | F01D 5/143 |
| | | | 416/193 A |
| 2006/0269409 A1* | 11/2006 | Torii | F01D 5/187 |
| | | | 416/97 R |
| 2013/0239541 A1* | 9/2013 | Shepherd | F01D 5/145 |
| | | | 60/39.83 |
| 2015/0110616 A1* | 4/2015 | Stein | F01D 9/041 |
| | | | 415/208.1 |

\* cited by examiner

AIRFOIL ASSEMBLY WITH PLATFORM FILM HOLES

TECHNICAL FIELD

This disclosure generally relates to an apparatus and method for cooling a component and more specifically to cooling an engine component with an airfoil and platform.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low-pressure compressors to the engine components that require cooling. Temperatures in the high-pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blade assemblies and other engine components generally include one or more interior cooling circuits for routing the cooling air through the engine component to cool different portions of the engine component, and can include dedicated cooling circuits for cooling different portions of the engine component.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
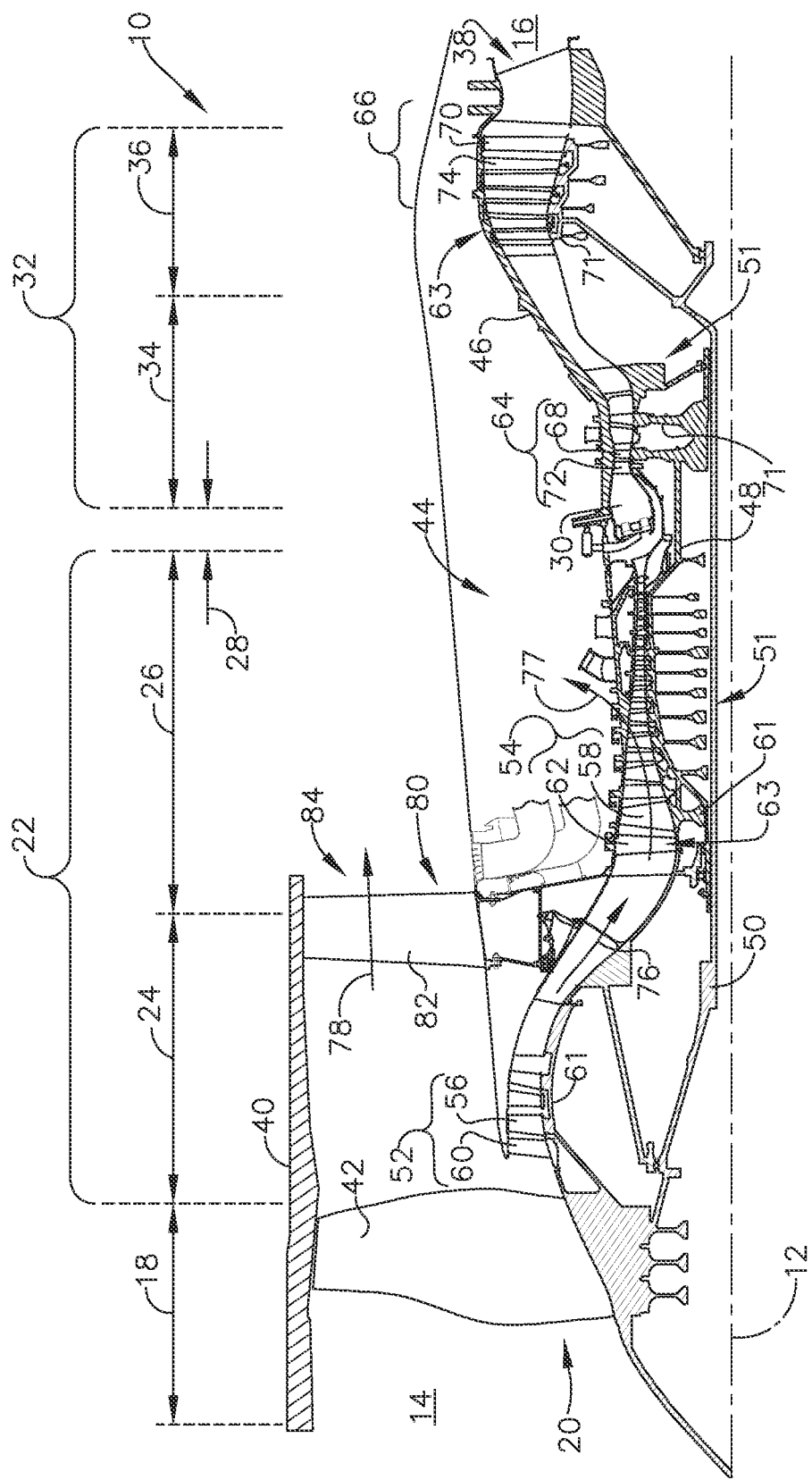
FIG. 1 is a schematic cross-sectional diagram of a gas turbine engine for an aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to an apparatus and method for cooling an airfoil assembly, and more particularly film holes within a platform of a turbine airfoil assembly. For purposes of illustration, the present disclosure will be described with respect to a blade assembly and cored platform. It will be understood, however, that aspects of the disclosure described herein are not so limited and may have general applicability within other engine components including vane assemblies and/or shroud assemblies. For example, a similar approach could be used for nozzle bands when those bands have embedded cooling circuits. Therefore, the term "platform" as used herein can include platforms for a blade assembly and nozzle bands for vane assemblies.

The disclosure herein is focused on cooling a fillet region where an airfoil meets a platform using film holes. The film holes can be angled toward the fillet using new methods. Previously, angles were not angled toward the fillet because machining film path holes from flow path side is blocked in a cored platform. The film holes described herein can be drilled with EDM drilling or laser drilling. The method and apparatus herein enables the use of these technologies and provides solutions to the difficulties presented when forming film holes in platforms with cores. It should be understood that other similar methods of forming the film holes can also benefit.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first," "second," and "third" can be used interchangeably to distinguish one component from another and are not intended to signify location or importance of the individual components.

The singular forms "a", "an", and "the" include plural references unless the context clearly dictates otherwise. Furthermore, as used herein, the term "set" or a "set" of elements can be any number of elements, including only one.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a gas turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering and exiting the combustor 30 is significantly increased. As such, cooling provided by the bleed air 77 is supplied to downstream turbine components (e.g., a blade 68) subjected to the heightened temperature environments.

A remaining portion of the airflow exiting the fan section, a bypass airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
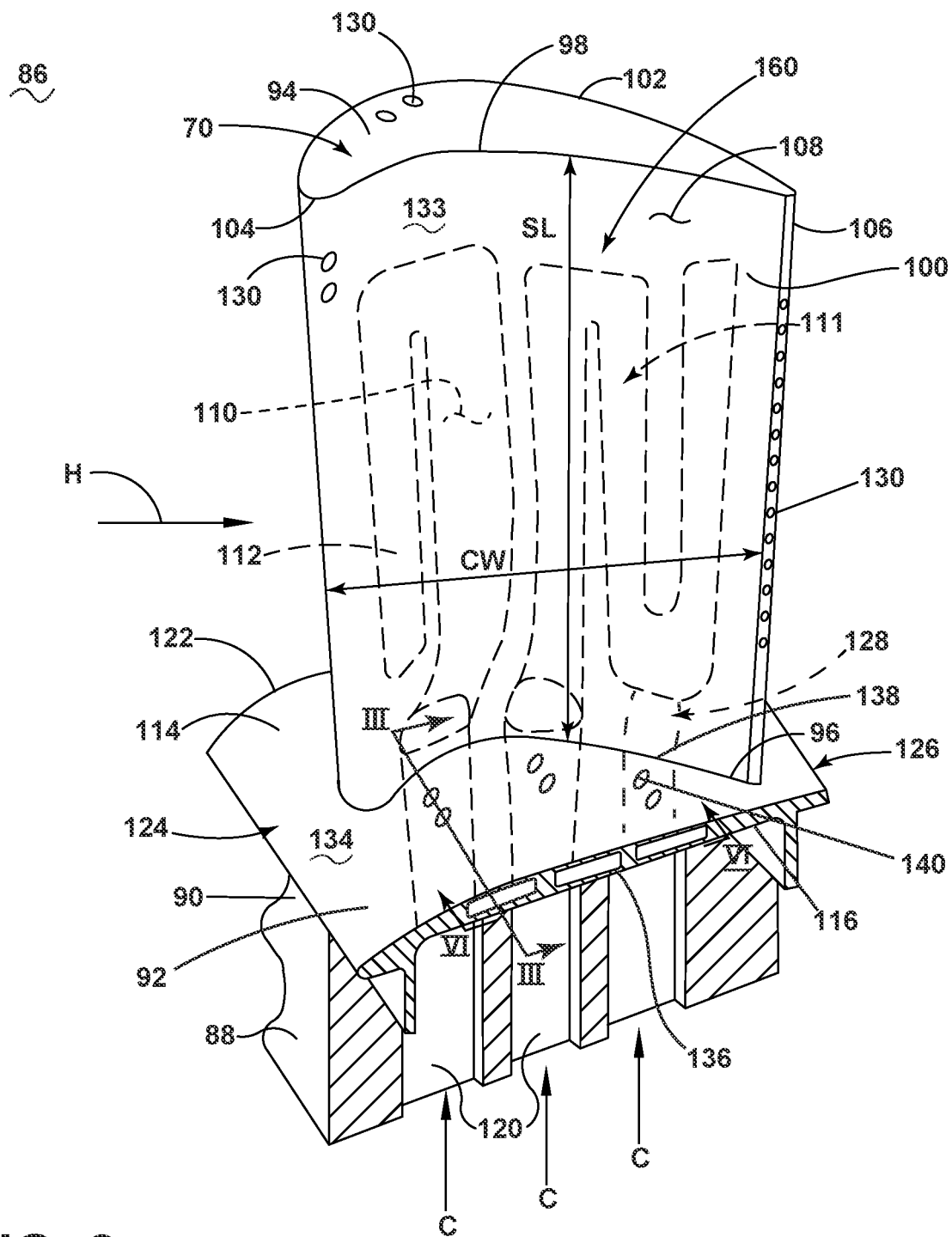
FIG. 2 is a perspective view of an airfoil assembly with an airfoil, a platform, and a set of film holes in the platform according to an aspect of the disclosure herein.

FIG. 2 is a perspective view of an airfoil assembly 86 in the form of a turbine blade assembly with a turbine blade 70 of the engine 10 from FIG. 1. Alternatively, the airfoil assembly can include a vane, a strut, a service tube, a shroud, or a combustion liner in non-limiting examples, or any other engine component that require or utilize cooling.

The airfoil assembly 86 includes a dovetail 88, a shank 90, a platform 92, and an airfoil 94. The airfoil 94 meets the platform 92 to define a root 96. The airfoil 94 extends between the root 96 and a tip 98 to define a span-wise direction (denoted "S"). A span length (denoted "SL") is measured along the span-wise direction between the root 96 and the tip 98. The root 96 represents 0% of the span length SL while the tip 98 represents 100% of the span length SL. When multiple airfoil assemblies 86 are circumferentially arranged in side-by-side relationship, the platform 92 helps to radially contain the turbine engine 10 mainstream air flow and forms the radially inner wall of an annulus through which the air flows. The dovetail 88 can be configured to mount to the turbine rotor disk 71 on the engine 10 from FIG. 1.

The airfoil 94 includes a first side 100, illustrated as a concave-shaped pressure side, and a second side 102, illustrated as a convex-shaped suction side, the first and second sides 100, 102 together define across-sectional shape of the airfoil 94. The airfoil 94 extends between an upstream edge 104, or a leading edge as illustrated, and a downstream edge 106, or a trailing edge as illustrated, to define a chord-wise direction (denoted "CW"). An outer periphery of the airfoil 94 is bound by an airfoil wall 108, which also defines the first and second sides 100, 102.

The platform 92 can include an upper wall 114 and a lower wall 116 radially spaced from each other to define at least a portion of a set of platform chambers 136. The platform 92 can define a pair of slash faces 122 and a platform leading edge 124 and a platform trailing edge 126. It should be understood that the platform 92 can have any thickness depending on the location of the turbine blade assembly 86 in the engine 10.

A set of cooling holes 130 can be located along any portion of the airfoil wall 108 including along the upstream edge 104, the downstream edge 106, the tip 98 and anywhere else as needed. The set of cooling holes 130 can pass through a substrate, which by way of illustration is the airfoil wall 108. The airfoil wall 108 can face a hot fluid flow (denoted "H") to define a heated surface. It should be understood, however, that the substrate can be any wall within the engine 10 including but not limited to interior walls, a tip wall, or a combustion liner wall.

A set of film holes 140 is located in the upper wall 114 of the platform 92. The set of film holes 140 are fluidly coupled to at least one platform chamber in the set of platform chambers 136. The set of film holes 140 open onto an exterior surface 134 of the upper wall 114.

The turbine blade assembly 86 can include a cooling supply circuit 111. The airfoil wall 108 can bound at least a portion of an interior 110 including at least one cooling supply conduit 112, illustrated in dashed line. A set of inlet passageways 120 can extend through the dovetail 88 and shank 90 to provide internal fluid communication with the at least one cooling supply conduit 112 and the set of platform chambers 136. A cooling fluid flow (denoted "C") can be supplied to the set of inlet passageways 120 and passed along to the at least one cooling supply conduit 112 and to the set of platform chambers 136. A set of passages 128 can fluidly couple the set of inlet passageways 120 to the at least one cooling supply conduit 112. Together the set of passages 128 at least one cooling supply conduit 112 and the set of platform chambers 136 define the cooling supply circuit 111.

Materials used to form the substrate and the cooling architecture can include, but are not limited to, steel, refractory metals such as titanium, or superalloys based on nickel, cobalt, or iron, and ceramic matrix composites. The substrate and cooling architecture can be formed by a variety of methods, including additive manufacturing, casting, electroforming, or direct metal laser melting, in non-limiting examples.

Figure 3:
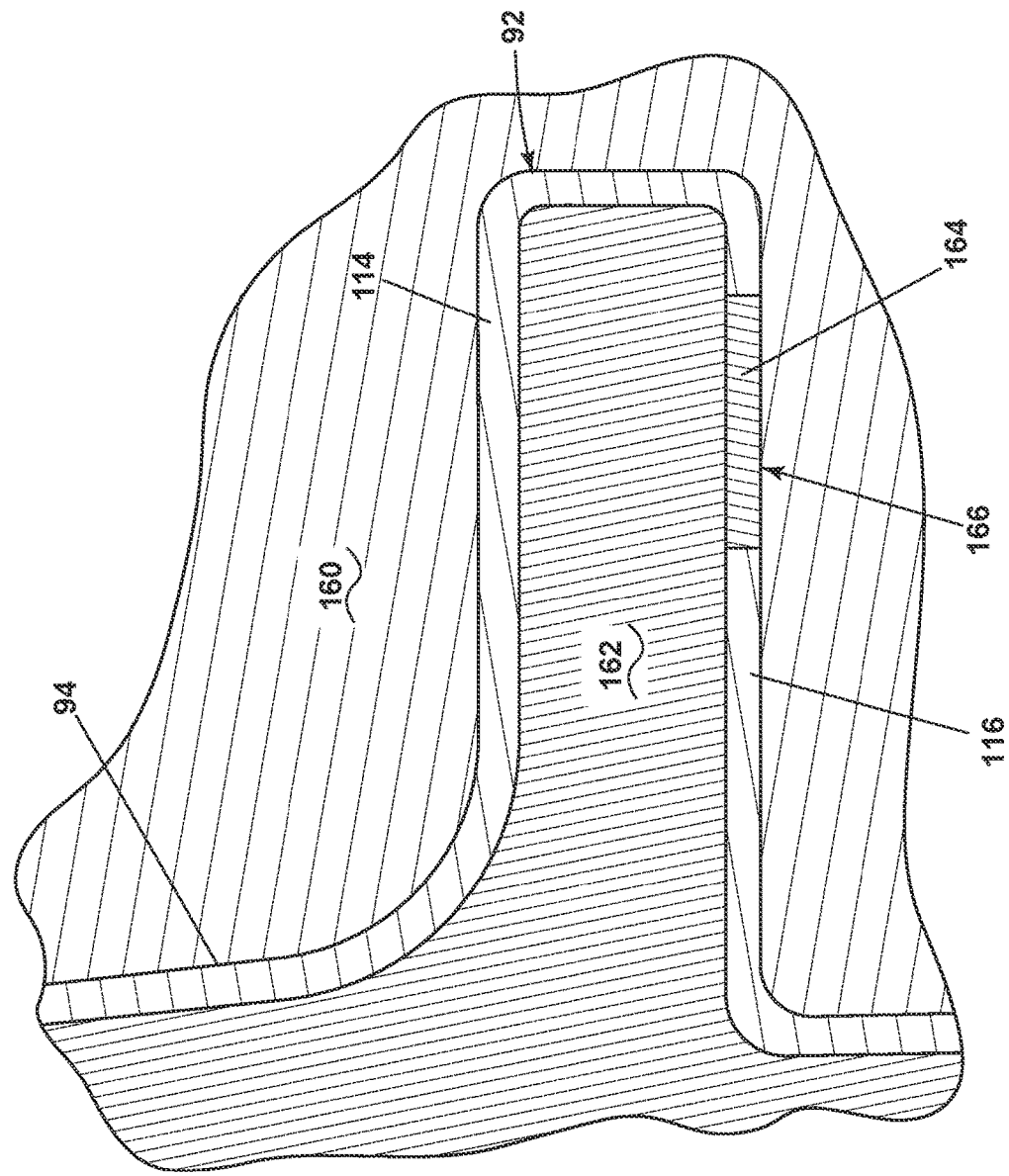
FIG. 3 is a schematic cross-section of the platform and airfoil of FIG. 2, taken along line III-III, illustrating a step of casting the platform and airfoil.
Figure 4A:
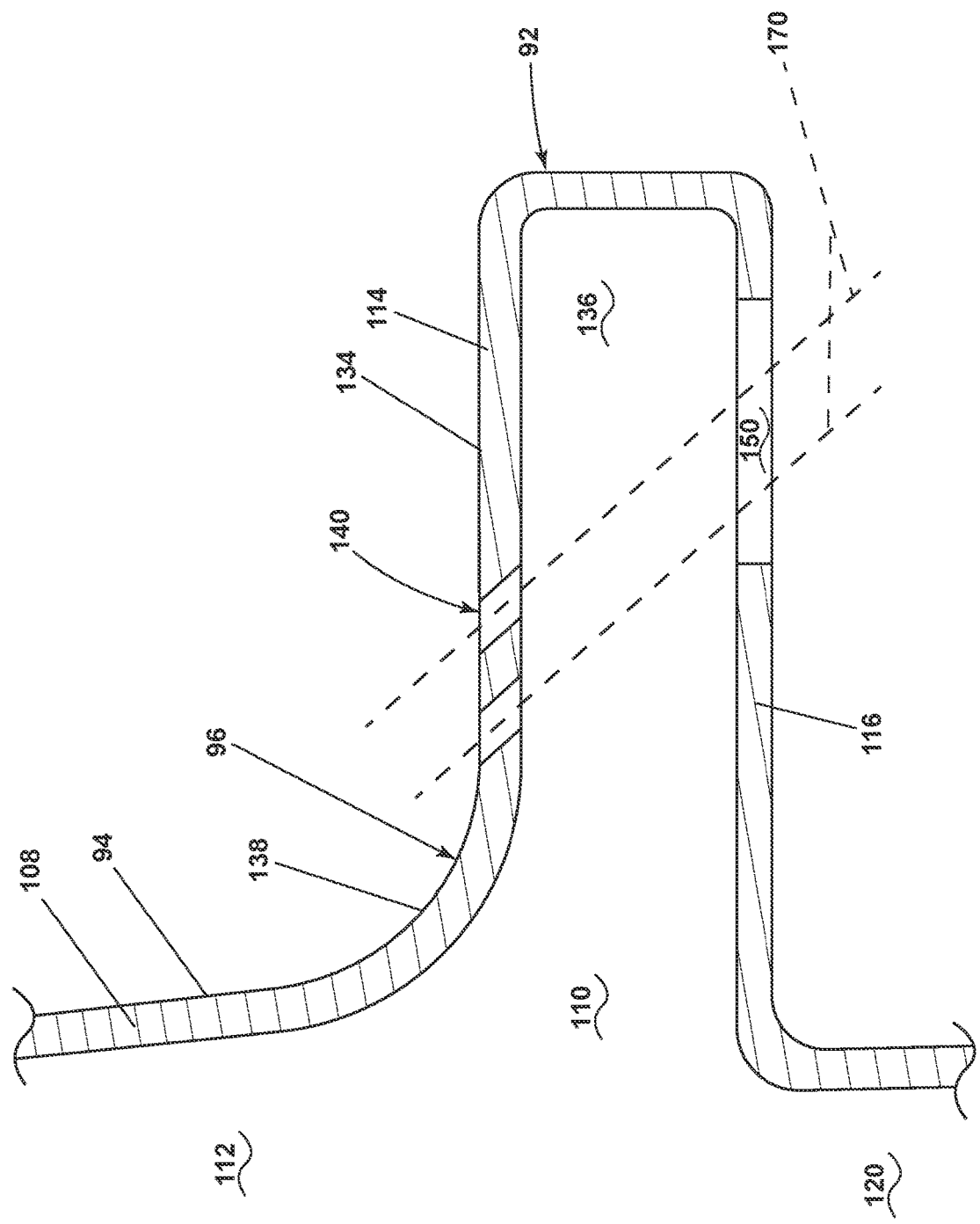
FIG. 4A is a schematic cross-section of the platform and airfoil of FIG. 2, after the casting process of FIG. 3, illustrating a step of drilling the platform.

FIG. 3 is a schematic cross-section along line III-III from FIG. 2 during a casting process of the platform 92 and airfoil 94. A shell 160 surrounds the platform 92 and a core 162 is located within the platform 92 to define the set of platform chambers 136 (FIG. 2). A core support 164 is placed between the shell 160 and core 162 at a predetermined location 166 to define an opening 150 (FIG. 4A). The predetermined location 166 can be within the lower wall 116 of the platform 92. The predetermined location 166 is a location determined during design and based on support requirements during the casting process. Further considerations for the predetermined location can include cooling needs and the location of the airfoil assembly 86 within the turbine engine 10. The core support 164 can be either integral with, and the same material as either the core 162 or the shell 160. Further the core support 164 can be integral and continuous with both the core 162 and the shell 160. In another non-limiting example, the core support 164 can be a separate piece separate from, but assembled with, either the core 162 and the shell 160. Further, the core support 164 can extend beyond the thickness of the lower wall 116 and extend into either or both of the core 162 and the shell 160. During the casting process, the core support 164 is necessary to ensure that the airfoil wall 108, upper wall 114, lower wall 116, and the slashfaces 122 are cast with the correct width.

FIG. 4A is a schematic cross-section of the platform 92 and airfoil 94 after the casting process of FIG. 3. The shell 160, core 162, and core support 164 have all been removed leaving behind the airfoil wall 108, the upper wall 114, lower wall 116, and the slashfaces 122. The walls 108, 114, 116 together define the interior 110 of the platform 92 and airfoil 94. The interior 110 includes the fluid supply circuit 112, the platform chambers 136, and the inlet passageways 120. The upper wall 114 and the lower wall 116 define at least a portion of the platform chamber 136. The at least one cooling supply conduit 112 is fluidly coupled to the set of platform chambers 136.

The opening 150 left by the core support 164 in the predetermined location 166 provides access to the set of platform chambers 136. While one opening is illustrated, it should be understood that multiple core supports 164 can be utilized leaving multiple openings 150 that can correspond to individual film holes in the set of film holes 140, or a large opening, as illustrated, allowing for access to all film holes in the set of film holes 140. Further, the opening 150 provides angled access to the upper wall 114. A set of drill lines 170 illustrate a line-of-site for drilling the set of film holes 140 in the upper wall 114 at an angle with respect to the exterior surface 134 of the upper wall 114 and/or the airfoil wall 108.

Figure 4B:
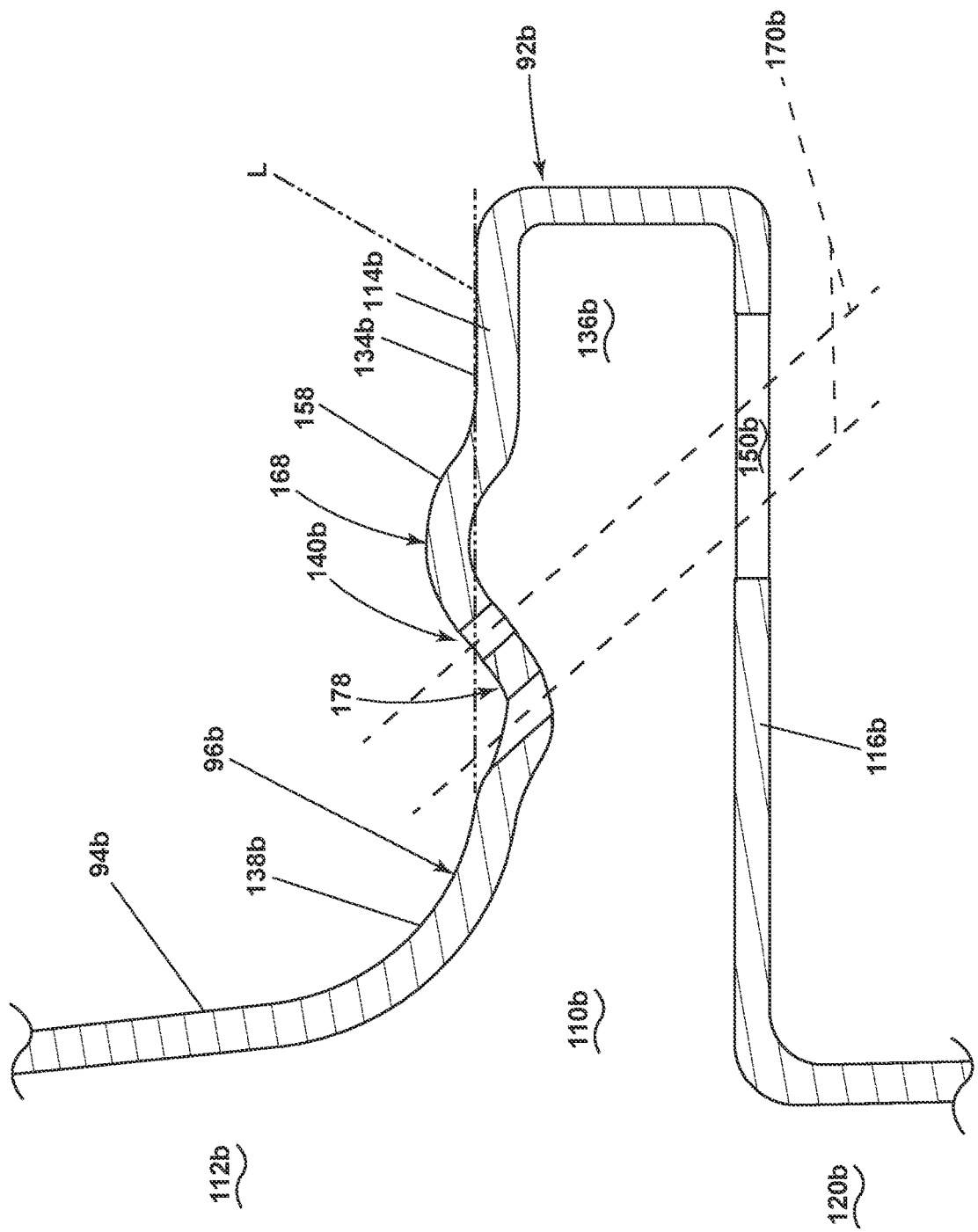
FIG. 4B is a schematic cross-section of a variation of the platform and airfoil from FIG. 4A with an undulating platform wall.

FIG. 4B is a schematic cross-section of a variation of FIG. 4A. While previously illustrated as relatively smooth, a platform 92b can have an aerodynamic surface contouring 158 (e.g. endwall contouring). The aerodynamic surface contouring 158 can be defined by three-dimensional contouring including raised regions 168 and lowered regions 178, also referred to as valleys and ridges, or bulges and bowls. This contouring of the upper wall 114b departs from a neatly axi-symmetric shaping. Drilling from, by way of non-limiting example via an opening 150b toward an upper wall 114b enables a set of film holes 140b to exit along any surface geometry including the surface contouring 158. Specifically, drilling into the lowered region 178 or a bowl-shaped area is made more plausible by accessing the inside surface of the upper wall 114b through the opening 150b in the lower wall 116b and drilling upward through the upper wall 114b. A set of drill lines 170b illustrate a line-of-site for drilling the set of film holes 140b in the upper wall 114b at an angle with respect to a line of best fit (denoted "L") of the exterior surface 134b of the upper wall 114b.

Figure 5:
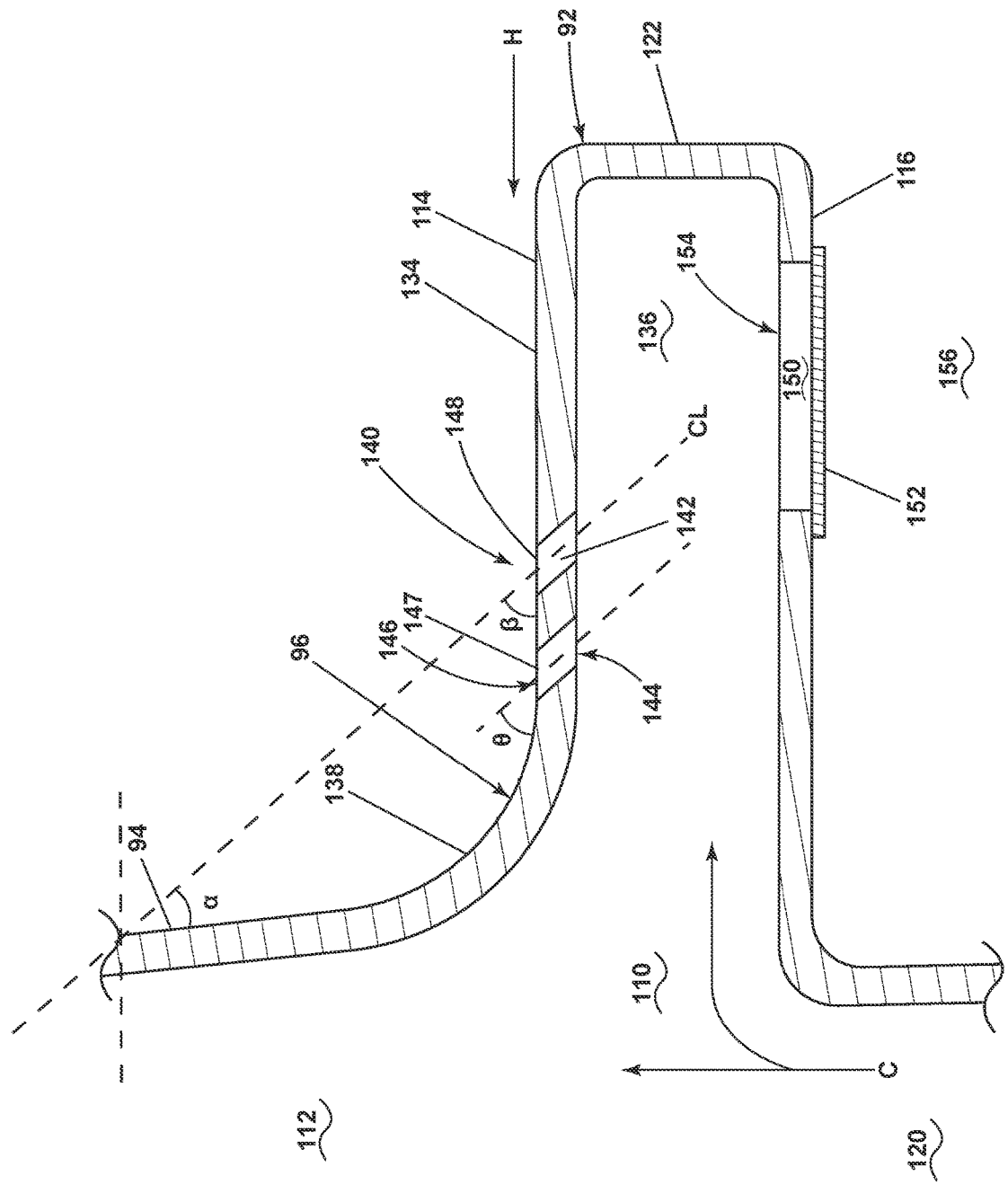
FIG. 5 is a schematic cross-section of the airfoil assembly of FIG. 2, after the casting step of FIG. 3 and after the drilling step of FIG. 4A, illustrating a step of closing an opening.

FIG. 5 is a schematic cross-section taken along line III-III of FIG. 2 after the casting process of FIG. 3 and the drilling process of FIG. 4A. A first film hole 147 and a second film hole 148 in the set of film holes 140 are each defined by a passage 142 extending between an inlet 144 and an outlet 146 and defining a centerline (denoted "CL").

The inlet 144 is fluidly coupled to the set of platform chambers 136 and the outlet 146 is fluidly coupled to the heated surface 134. The set of film holes 140 can include multiple film holes. The first film hole 147 can be angled toward the airfoil 94 at a first angle θ with respect to the upper wall 114. The second film hole 148 can be angled toward the airfoil 94 at a second angle β with respect to the upper wall 114. In one aspect the airfoil angle α and the second angle β are the same.

An extension of the centerline CL for the set of film holes 140 can intersect the airfoil wall 108 at a location (denoted "X") at or less than 30% the span length SL of the airfoil 94. The location X can be further defined by an airfoil angle α. It is further contemplated that as the second angle β decreases, the airfoil angle α increases such that the location X is at or less than 10% the span length SL of the airfoil 94. It is further contemplated that the airfoil angle α, the first angle θ, and the second angle β are the same or different.

The outlet 146 of the first film hole 147 intersects with at least a portion of the fillet 138. The location X as previously defined can determine a proximate location of the outlet 148 of the second film hole. The outlet 146 of the second film hole 148 can open proximate to the fillet 138 as illustrated without intersecting any portion of the fillet 138.

A seal 152 is illustrated as, by way of non-limiting example, a cover plate. The seal 152 can define at least a portion of the lower wall 116 and cover the opening 150. The opening 150 and the seal 152 define a recess 154 in the lower wall 116.

The seal 152 closes the opening 150 to separate at least a portion of the platform chamber 136 from an exterior 156 of the platform 92. While illustrated as a plate covering the recess 154, it is further contemplated that the seal 152 is a braze plug used to close the opening 150. In other words, the seal 152 can be flush with the lower wall 116. It should be understood that the seal 152 need not be flush, nor need it create a recess.

During operation, the cooling fluid flow C can be supplied to the interior 110 and passed along to the at least one cooling supply conduit 112 and to the set of platform chambers 136. While illustrated as one open space, the interior 110 can include multiple passages fluidly coupling the set of inlet passageways 120 to the set of platform chambers 136. Furthermore, multiple walls can be provided in the interior to fluidly separate at least portions of the at least one cooling supply conduit 112 from the set of platform chambers 136. The schematic cross-section is simplified for clarity.

Figure 6:
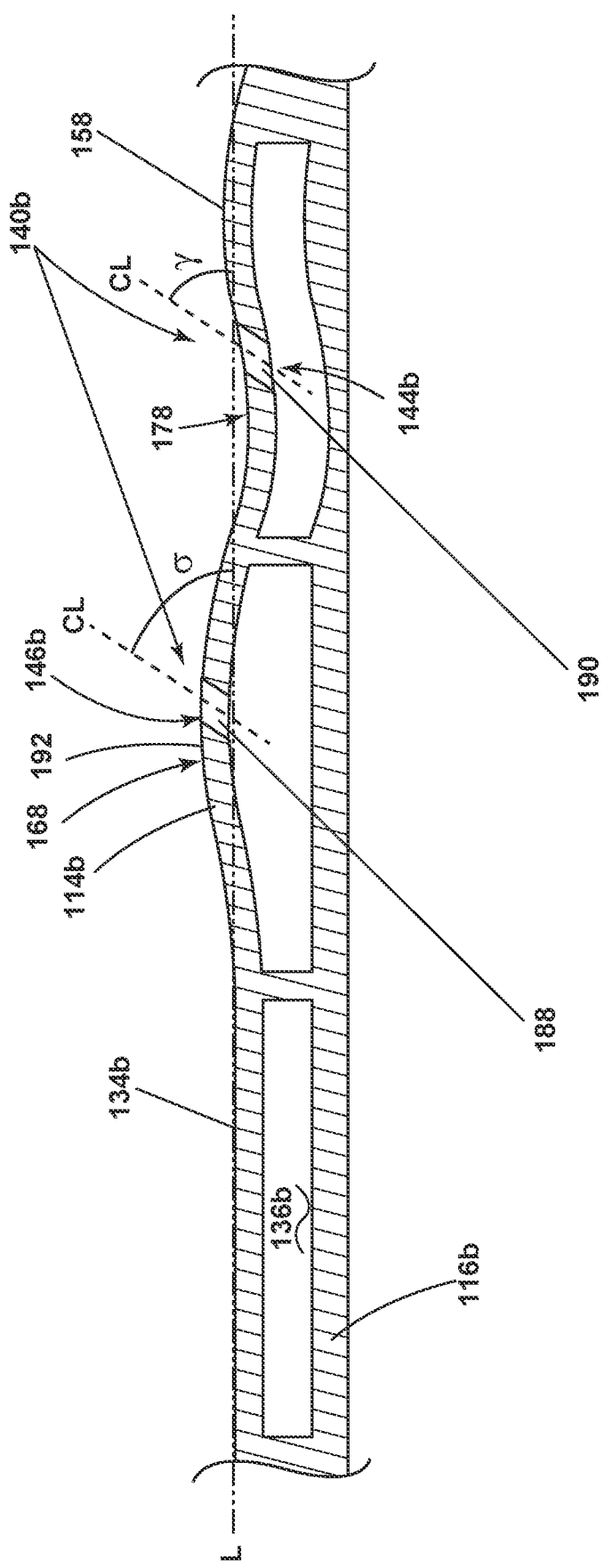
FIG. 6 is a cross-sectional view of a variation of the platform from FIG. 2 as seen from line VI-VI with an undulating platform wall.

FIG. 6 is a schematic cross-section of a variation of the platform 92 from FIG. 2 as seen from line VI-VI. This variation can be the same platform 92b as FIG. 4B. The set of film holes 140b can be angled in a compound manner such that the film holes are angled toward the airfoil and also in a downstream direction as illustrated. Each film hole in the set of film holes 140b can exit onto a portion of the upper wall 114b that is characterized by the surface contouring 158.

In one non-limiting example a first compound film hole 188 can exit onto the exterior surface 134b at a top 192 of the raised region 168 to define a first compound angle σ. In another example a second compound film hole 190 can exit onto the exterior surface 134b at the lowered region 178 where the exterior surface 134b is transitioning towards another raised region or bulge to define a second compound angle γ.

It should be understood that the first compound film hole 188 and the second compound film hole 190 can be part of any of the set of film holes described herein. Further the first compound film hole 188 and the second compound film hole 190 can be any one of the first, second, third, fourth, or fifth film holes described herein. It should also be understood that the values for the first compound angle σ and the second compound angle γ match the constraints of the first angle α and the second angle β. In other words, the first or second compound angle and the first or second angle can have the same value.

Figure 7:
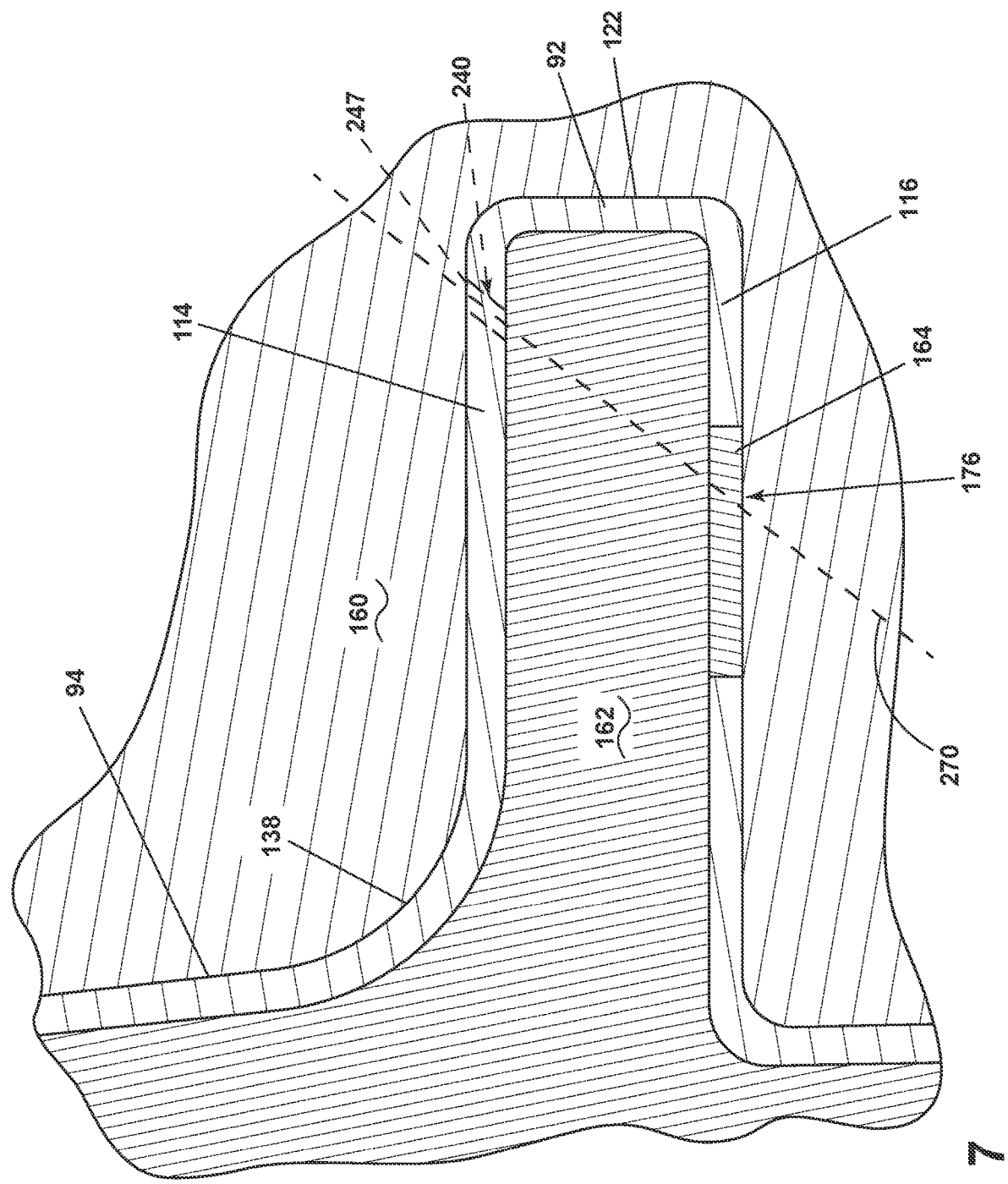
FIG. 7 is a schematic cross-section of a variation of the casting step of FIG. 3 according to another aspect of the disclosure herein.

FIG. 7 is a schematic cross-section of a variation of the casting process of FIG. 3 according to another aspect of the disclosure herein. The shell 160 surrounds the platform 92 and the core 162 is located within the platform 92 to define the set of platform chambers 136 (FIG. 2). The core support 164 is placed between the shell 160 and core 162 at a second predetermined location 176. A second set of drill lines 270 is illustrated in phantom to show an alternative location for a second set of film holes 240. The second set of film holes 240 can include a third film hole 247 that is angled toward the slashface 122, or away from the fillet 138. The third film hole 247 can be angled toward the slashface 122 to enhance the film cooling benefit at the edges of the surface, or to strategically setup an airfoil downstream of the platform 92 with additional cooling from the platform 92. It should be understood that the opening 150, 140*b* (FIG. 4A, FIG. 4B) left by the core support 164 can be utilized to also drill the first set of film holes 140, 140*b* (FIG. 4A, FIG. 4B)

Figure 8:
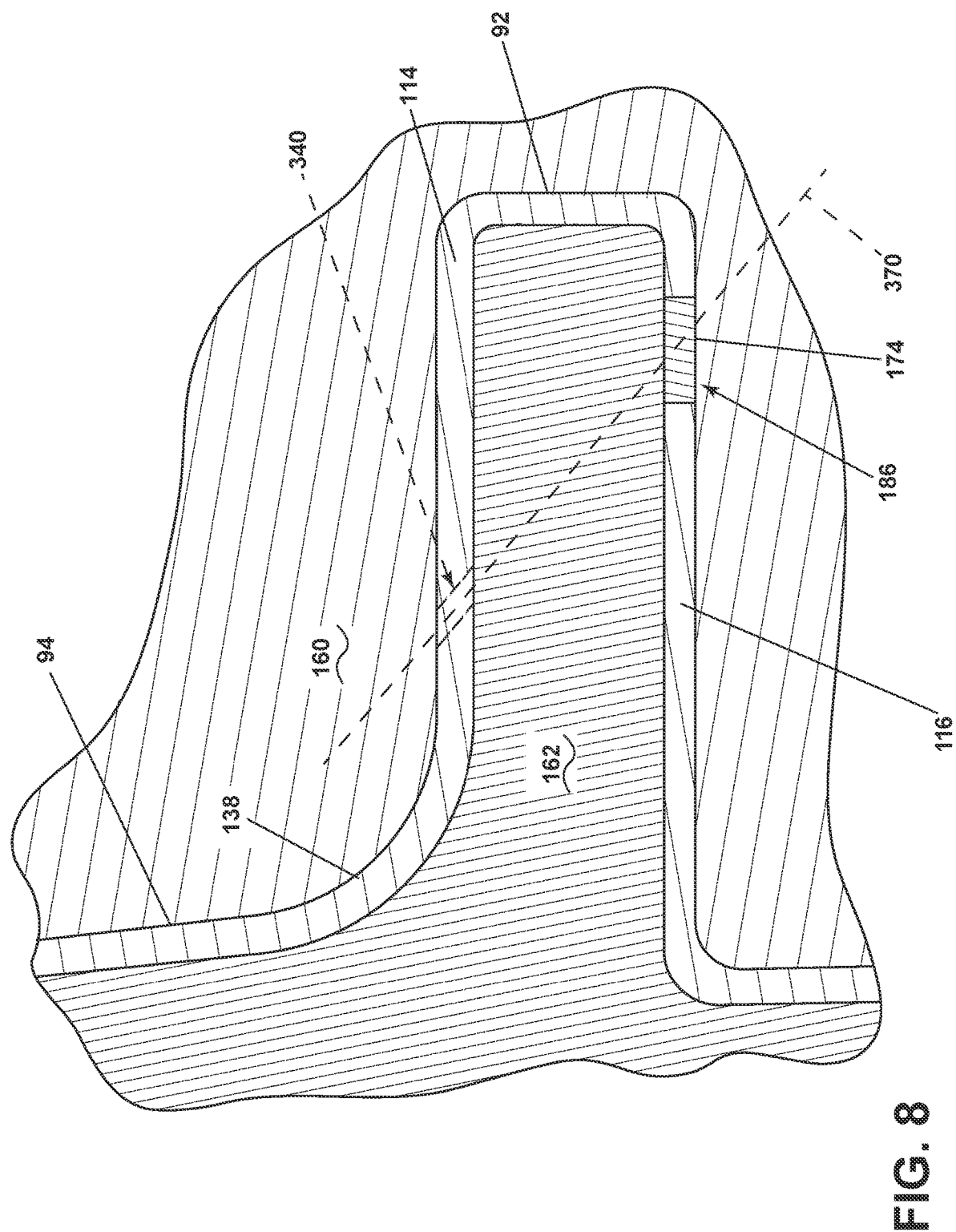
FIG. 8 is a schematic cross-section of another variation of the casting step of FIG. 3 according to yet another aspect of the disclosure herein.

FIG. 8 is a schematic cross-section of another variation of the casting process of FIG. 3 according to yet another aspect of the disclosure herein. The shell 160 surrounds the platform 92 and the core 162 is located within the platform 92 to define the set of platform chambers 136 (FIG. 2). A smaller core support 174 is placed between the shell 160 and core 162 at a third predetermined location 186. A third set of drill lines 370 is illustrated in phantom to show an alternative location for a third set of film holes 340. During casting, when the smaller core supports 174 are utilized, smaller holes are a result. The third set of film holes 340 can still be formed in the event there is a lesser amount of film holes required than the set of film holes 140 previously described herein.

Figure 9:
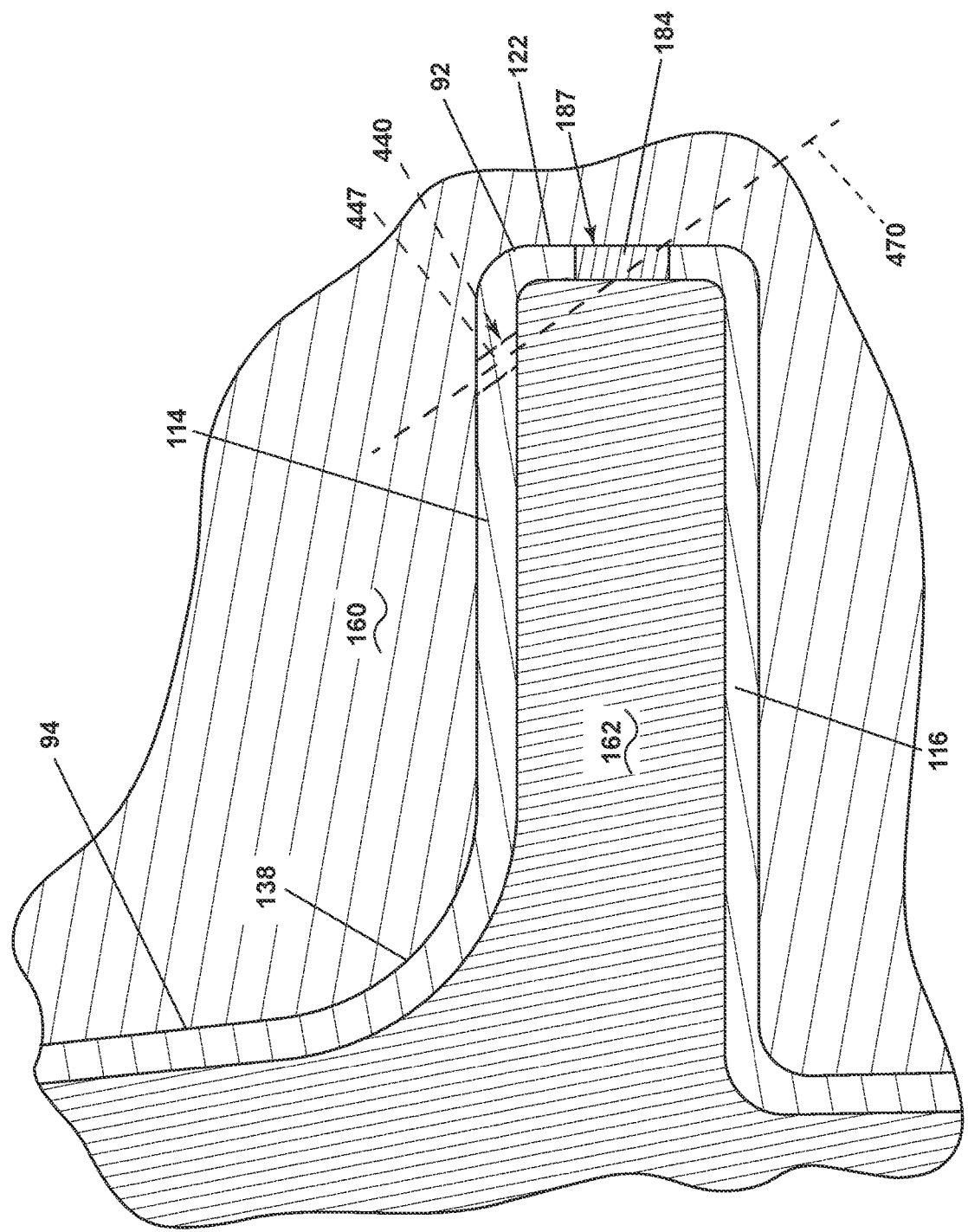
FIG. 9 is a schematic cross-section of yet another variation of the casting step of FIG. 3 according to another aspect of the disclosure herein.

FIG. 9 is a schematic cross-section yet another variation of the casting process of FIG. 3 according to another aspect of the disclosure herein. The shell 160 surrounds the platform 92 and the core 162 is located within the platform 92 to define the set of platform chambers 136 (FIG. 2). A slash face core support 184 is placed between the shell 160 and core 162 at a fourth predetermined location 187 in the slash face 122. A fourth set of drill lines 470 is illustrated in phantom to show an alternative location for a fourth set of film holes 440 including a fourth film hole 447. The fourth set of film holes 447 is angled toward the fillet 138 as previously described herein. This is an alternative way to get platform cooling near at least one of the pair of slash faces 122 without accessing from the lower wall 116. While the fourth set of film holes 447 can be located proximate at least one of the pair of slash faces 122, it should be understood that the fourth set of drill lines 470 can be manipulated to extend closer to the fillet 138 as previously described herein to drill the first set of film holes 140, 140*b* (FIG. 4A, FIG. 4B).

Figure 10:
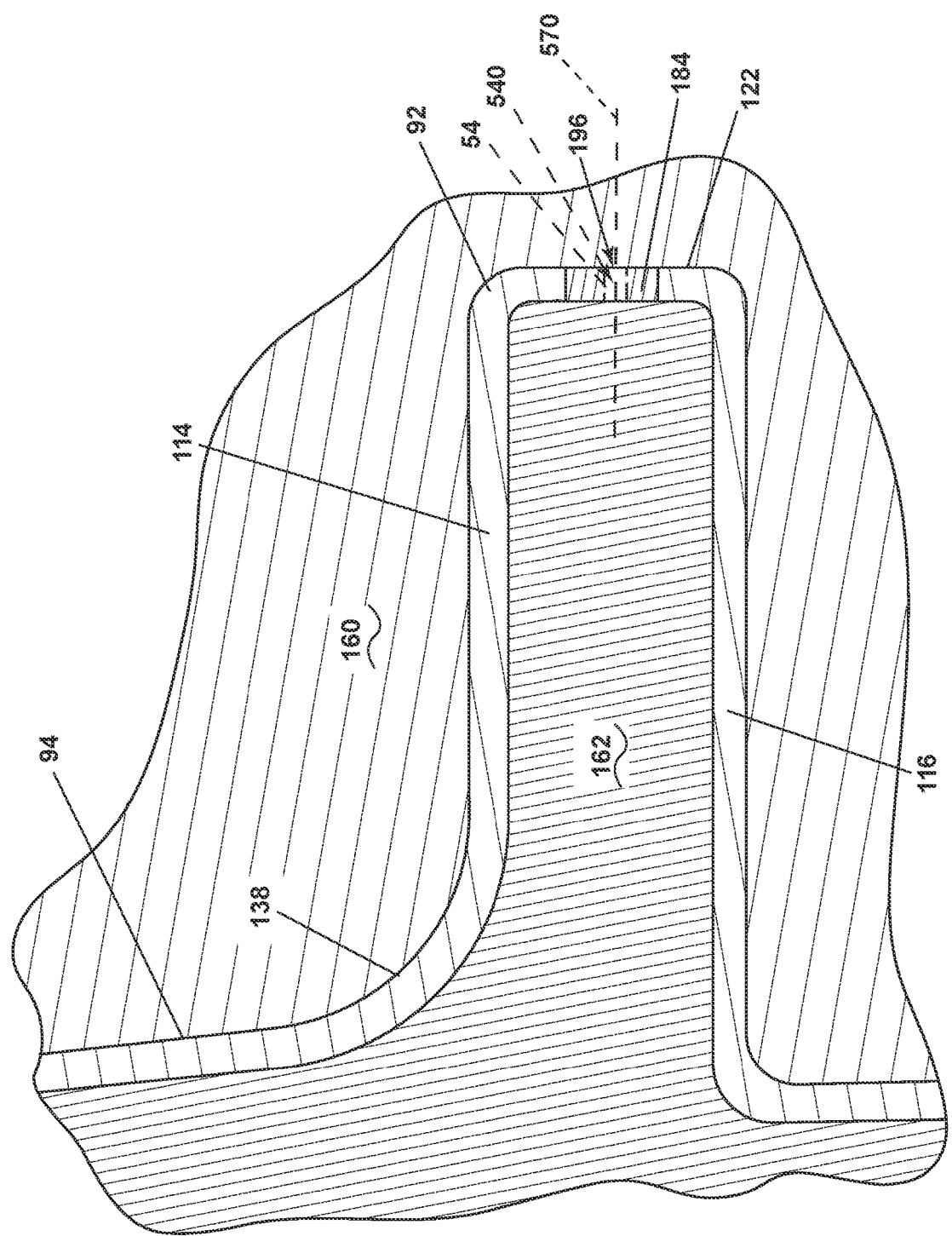
FIG. 10 is a schematic cross-section of another variation of the casting step of FIG. 3 according to another aspect of the disclosure herein.

FIG. 10 is a schematic cross-section yet another variation of the casting process of FIG. 3 according to another aspect of the disclosure herein. The shell 160 surrounds the platform 92 and the core 162 is located within the platform 92 to define the set of platform chambers 136 (FIG. 2). A slash face core support 184 is placed between the shell 160 and core 162 at a fifth predetermined location 196. A fifth set of drill lines 570 is illustrated in phantom to show an alternative location for a fifth set of film holes 540 including a fifth film hole 547. The fifth film hole 547 extends generally perpendicular with respect to at least one of the pair of slash faces 122. In this manner, cooling can be provided to an adjacent slash face to reduce local temperatures of an airfoil associated with the adjacent slash face. A braze plug can be utilized to seal up the core support.

While the fifth set of film holes 547 can be located within at least one of the pair of slash faces 122, it should be understood that the fifth set of drill lines 570 can be manipulated to as previously described herein to drill the first set of film holes 140, 140*b* (FIG. 4A, FIG. 4B). Upon completion of drilling the first set of film holes 140, 140*b*, the fifth set of film holes 540 can be formed.

Depending on the predetermined locations 166, 176, 186, 187 described herein, any number of the sets of film holes 140, 140*b*, 240, 340, 440, 540 can be formed utilizing the openings 150, 150*b* left behind.

Figure 11:
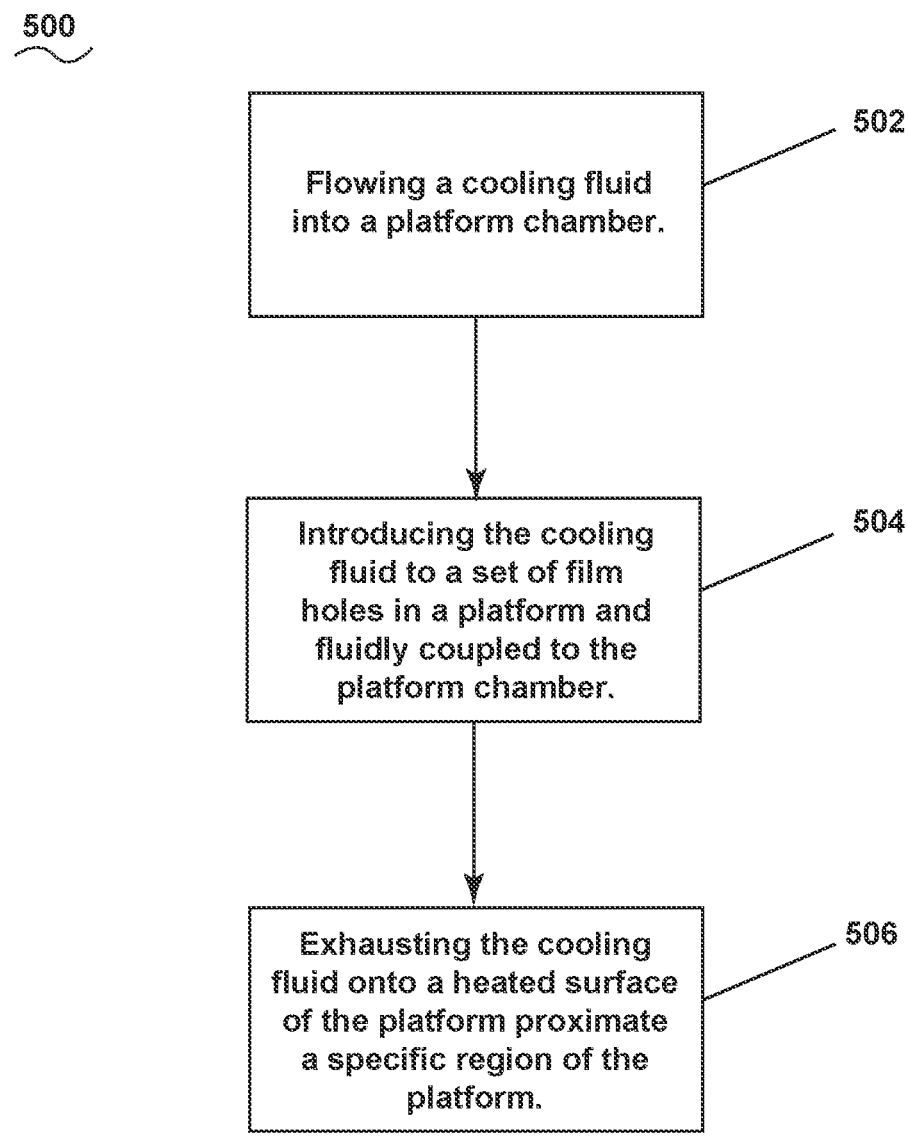
FIG. 11 is a flow chart illustrating a method of cooling the airfoil assembly of FIG. 2.

FIG. 11 is a flow chart illustrating a method 500 of cooling the exterior surface 134 of the airfoil assembly 86. At block 502, the method 500 includes flowing a cooling fluid into the set of platform chambers 136. At block 504, the method 500 includes introducing the cooling fluid to the set of film holes 140. At block 506, the method 500 includes exhausting the cooling fluid onto the exterior surface 134. The cooling fluid can exhaust proximate a specific region of the platform including the fillet 138, the raised regions 168, or the lowered regions 178. It is further contemplated that the cooling fluid exhausts at all or any combination of the fillet 138, the raised regions 168, and the lowered regions 178.

Figure 12:
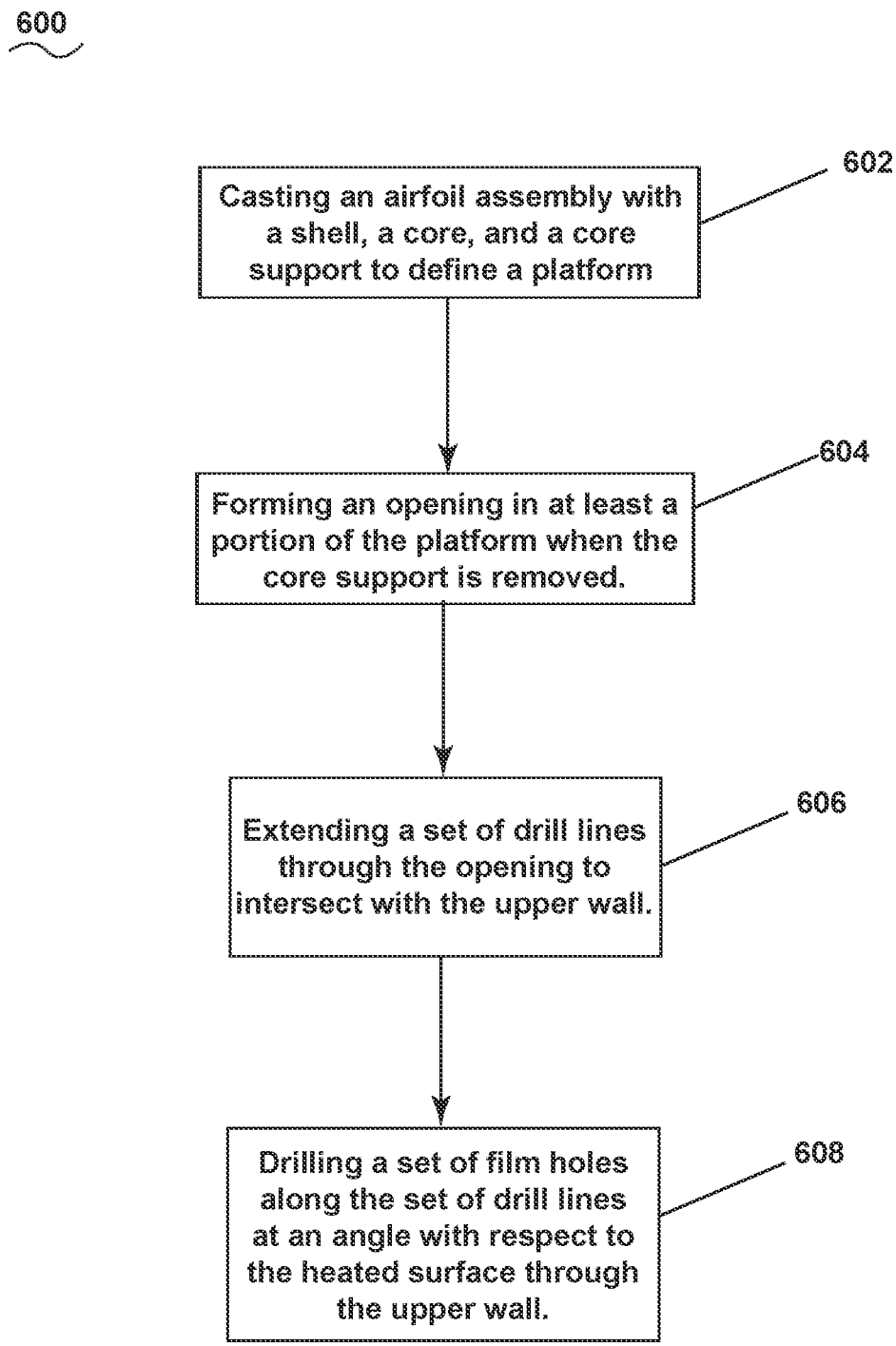
FIG. 12 is a flow chart illustrating a method of forming the set of film holes for the airfoil assembly of FIG. 2.

FIG. 12 is a flow chart illustrating a method 600 of forming the set of film holes 140 in the airfoil assembly 86. At block 602, the method 600 includes casting the airfoil assembly 86 with the shell 160, core 162, and core support 164 to define the platform 92. At block 604, the method 600 includes forming the opening 150 in at least a portion of the platform 92 when the core support 164 is removed. At block 606, the method 600 includes extending the set of drill lines 170 through the opening 150 to intersect with the upper wall 114. At block 608, the method 600 includes drilling the set of film holes 140 at an angle with respect to the exterior surface through the upper wall 114.

The method 600 can further include closing the opening 150 with the seal 152 after drilling the set of film holes 140. The method 600 can further include at least partially closing the opening 150 to define a partial opening to allow for coolant directed toward an opposing slash face 122.

The method 600 can further include introducing a shaping to the set of film holes 140. The shaping can be accomplished through the drilling technique already described. Further electrical discharge machining (EDM) drilling can be utilized to shape the outlet 146 of the set of film holes 140. It should be understood that any technique suitable for forming the set of film holes 140 and benefiting from utilizing the opening 150 is contemplated.

It should be understood that while numerals associated with FIG. 4A and FIG. 6 are utilized in the method descriptions, the methods 500, 600 can be performed to form any of the sets of film holes 140, 240, 340, 440, 540 described herein.

Traditionally, forming film holes is limited by line-of-sight production capabilities. For example, producing film holes that eject close to a surface fillet would not be possible. By using the cored platform opening, the film holes can be manufactured from the backside of the hardware where clearance is significantly larger for hole production. Holes formed in this manner eject coolant much closer to regions of high heat or stress loads thereby improving the durability of the hardware. Further, the method as described herein gives more flexibility for film hole modification that can occur in operations after castings have been produced. This allows designers to react to hardware distress by modifying film pattern.

It should be understood that any combination of the geometry related to the set of film holes discussed herein is contemplated. The varying aspects of the disclosure discussed herein are for illustrative purposes and not meant to be limiting. It should be appreciated that application of the disclosed design can be for any applicable components, including any component in need of coating and masking.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An airfoil assembly for a turbine engine, the airfoil assembly comprising a platform including an upper wall and a lower wall radially spaced from each other to define at least a portion of a set of platform chambers, at least the upper wall defining an exterior surface, the platform axially extending between a platform leading edge and a platform trailing edge and circumferentially extending between a pair of slash faces, an airfoil having an airfoil wall and extending radially between a root and a tip to define a span length, the platform extending from the airfoil wall proximate the root; a fillet extending between the exterior surface and the airfoil wall and defining at least a portion of the root; and a set of film holes comprising at least one film hole having a passage extending between an inlet and an outlet, the passage defining a centerline, the inlet fluidly coupled to at least one platform chamber in the set of platform chambers and the outlet fluidly coupled to the heated surface, the centerline angled toward the airfoil.

The airfoil assembly of any preceding clause, wherein the centerline intersects the airfoil wall between the root and 30% of the span length from the root.

The airfoil assembly of any preceding clause, wherein the at least one film hole is a first film hole and the outlet is located within the fillet.

The airfoil assembly of any preceding clause, wherein the at least one film hole is a second film hole and the outlet is located within the exterior surface at a proximate location where the fillet meets the exterior surface of the platform.

The airfoil assembly of any preceding clause, wherein the centerline is angled in a compound manner toward the fillet to define a compound film hole.

The airfoil assembly of any preceding clause, wherein the centerline is angled in a downstream direction.

The airfoil assembly of any preceding clause, wherein the set of film holes further comprises a third film hole angled away from the fillet.

The airfoil assembly of any preceding clause, wherein the centerline of the third film hole is angled toward at least one of the pair of slash faces with respect to the upper wall.

The airfoil assembly of any preceding clause, wherein the at least one film hole is a fourth film hole located proximate at least one of the pair of slash faces.

The airfoil assembly of any preceding clause, wherein the set of film holes further comprise a fifth film hole located in at least one of the pair of slash faces.

The airfoil assembly of any preceding clause, wherein the lower wall further comprises at least one opening.

The airfoil assembly of any preceding clause, wherein the centerline passes through the at least one opening.

The airfoil assembly of any preceding clause, wherein at least one platform chamber in the set of platform chambers is sealed at the at least one opening by a cover plate.

The airfoil assembly of any preceding clause, wherein at least one of the pair of slash faces further comprises at least one opening.

The airfoil assembly of any preceding clause, wherein the centerline passes through the at least one opening.

The airfoil assembly of any preceding clause, wherein at least one platform chamber in the set of platform chambers is sealed at the at least one opening by a cover plate.

The airfoil assembly of any preceding clause, wherein the set of film holes comprises multiple film holes.

A method of cooling a exterior surface of an airfoil assembly comprising flowing a cooling fluid into a platform chamber, introducing the cooling fluid to the set of film holes, and exhausting the cooling fluid onto the exterior surface proximate a specific region of the platform.

The method of any preceding clause wherein the specific region is at least one of a fillet, a raised region, or a lowered region.

A method of forming a set of film holes in a platform of an airfoil assembly, the method comprising casting the airfoil assembly with a shell, a core, and a core support to define a platform having an upper wall defining an exterior surface; forming an opening in at least a portion of the platform separate from the upper wall when the core support is removed; extending a set of drill lines through the opening to intersect with the upper wall; and drilling a set of film holes along the set of drill lines at an angle with respect to the heated surface through the upper wall.

The method of any preceding clause, further comprising at least partially closing the opening with a seal.

The method of any preceding clause further comprising closing the opening with a seal.

The method of any preceding clause further comprising partially closing the opening with a seal to define a partial opening to allow for coolant directed toward an opposing slash face.

The method of any preceding clause wherein the seal is a braze plug.

What is claimed is:

1. An airfoil assembly for a turbine engine, the airfoil assembly comprising:
    a platform including an upper wall and a lower wall radially spaced from each other to define at least a portion of a set of platform chambers, at least the upper wall defining an exterior surface, the platform axially extending between a platform leading edge and a platform trailing edge and circumferentially extending between a pair of slash faces,
    an airfoil having an airfoil wall and extending radially between a root and a tip to define a span length, the platform extending from the airfoil wall proximate the root;
    a fillet extending between the exterior surface and the airfoil wall and defining at least a portion of the root; and
    a set of film holes comprising at least one film hole having a passage extending between an inlet and an outlet, the passage defining a centerline, the inlet fluidly coupled to at least one platform chamber in the set of platform chambers and the outlet fluidly coupled to a heated surface of the platform, the centerline angled toward the airfoil;
    wherein at least one of the pair of slash faces further comprises at least one opening; and
    wherein the centerline passes through the at least one opening.

2. The airfoil assembly of claim 1, wherein at least one platform chamber in the set of platform chambers is sealed at the at least one opening by a cover plate.

3. The airfoil assembly of claim 1, wherein the set of film holes comprises multiple film holes.

4. The airfoil assembly of claim 1, wherein the outlet intersects with at least a portion of the fillet.

5. The airfoil assembly of claim 1, wherein the outlet is located within the exterior surface at a proximate location where the fillet meets the exterior surface of the platform.

6. The airfoil assembly of claim 1, wherein the set of film holes further comprises a third film hole angled away from the fillet.

7. The airfoil assembly of claim 6, wherein the centerline of the third film hole is angled toward at least one of the pair of slash faces with respect to the upper wall.

8. The airfoil assembly of claim 1, wherein the at least one film hole is located proximate at least one of the pair of slash faces.

9. The airfoil assembly of claim 1, wherein the set of film holes further comprise a fifth film hole located in at least one of the pair of slash faces.

10. The airfoil assembly of claim 1, wherein the lower wall further comprises at least one opening.

11. The airfoil assembly of claim 1, wherein an outlet of the second film hole is located at a lowered region of the plurality of lowered regions.

12. The airfoil assembly of claim 1, wherein the platform includes surface contouring comprising a plurality of raised regions and a plurality of lowered regions, wherein the at least one film hole comprises a first film hole, and wherein the set of film holes further comprises a second film hole provided at the surface contouring.

* * * * *